United States Patent
Monteiro Teixeira et al.

(10) Patent No.: US 11,247,848 B2
(45) Date of Patent: Feb. 15, 2022

(54) CONTAINER ROTATOR APPARATUS FOR A CONTAINER MANUFACTURING LINE

(71) Applicant: Ball Corporation, Westminster, CO (US)

(72) Inventors: Rafael Arthur Monteiro Teixeira, Pouso Alegre (BR); Lucas da Silva Sequi, Pouso Alegre (BR)

(73) Assignee: Ball Corporation, Westminster, CO (US)

( * ) Notice: Subject to any disclaimer, the term of this patent is extended or adjusted under 35 U.S.C. 154(b) by 0 days.

(21) Appl. No.: 17/116,574

(22) Filed: Dec. 9, 2020

(65) Prior Publication Data

US 2021/0171289 A1 Jun. 10, 2021

Related U.S. Application Data

(60) Provisional application No. 62/945,714, filed on Dec. 9, 2019.

(51) Int. Cl.
*B65G 47/24* (2006.01)
*B65G 47/44* (2006.01)

(52) U.S. Cl.
CPC ...... *B65G 47/24* (2013.01); *B65G 2201/0235* (2013.01); *B65G 2207/08* (2013.01)

(58) Field of Classification Search
CPC .............................. B65G 47/24; B65G 47/44
USPC ............................................ 198/417; 193/46
See application file for complete search history.

(56) References Cited

U.S. PATENT DOCUMENTS

| | | | | |
|---|---|---|---|---|
| 4,098,391 A | * | 7/1978 | Hernandez | B65G 47/248 198/417 |
| 4,458,801 A | | 7/1984 | Nichols | |
| 4,492,299 A | * | 1/1985 | McLeod | B65G 47/248 198/417 |
| 6,006,891 A | * | 12/1999 | Iwano | B65G 47/248 198/404 |
| 6,116,401 A | | 9/2000 | Carleton | |
| 7,617,921 B2 | * | 11/2009 | Workman | B65G 47/248 193/29 |

(Continued)

OTHER PUBLICATIONS

International Search Report and Written Opinion for International (PCT) Patent Application No. PCT/US20/63999, dated Feb. 26, 2021 13 pages.

*Primary Examiner* — Douglas A Hess
(74) *Attorney, Agent, or Firm* — Sheridan Ross P.C.

(57) ABSTRACT

A rotational device is provided that reorients a container from a first orientation to a second orientation in a manufacturing line and receives and reorients containers with different dimensions. The rotational device has an enclosed passageway defined by four continuous, turning surfaces that contribute to the ability of the rotational device to receive and reorient containers with different dimensions. In one embodiment, the passageway of the rotational device rotates 90 degrees in a clockwise manner. The bottoms of the different sized container are aligned with a right edge of an entrance of the passageway that corresponds to a surface that turns and defines the bottom edge of an exit of the passageway. Thus, the rotational device can receive containers with different dimensions while reduces the movement or jostling of the containers within the passageway.

21 Claims, 10 Drawing Sheets

(56) References Cited

U.S. PATENT DOCUMENTS

| | | | |
|---|---|---|---|
| 8,561,782 B2* | 10/2013 | McGarry | B65G 47/24 |
| | | | 198/417 |
| 8,657,099 B2* | 2/2014 | Bianchini | B29C 49/4205 |
| | | | 198/417 |
| 9,809,399 B1 | 11/2017 | Lindauer et al. | |
| 10,703,523 B2* | 7/2020 | Thomas | B65B 3/32 |
| 10,807,806 B1* | 10/2020 | Womack | B65G 11/023 |

* cited by examiner

CONTAINER ROTATOR APPARATUS FOR A CONTAINER MANUFACTURING LINE

CROSS-REFERENCE TO RELATED APPLICATIONS

This application claims priority under 35 U.S.C. § 119(e) to U.S. Provisional Patent Application Ser. No. 62/945,714 filed Dec. 9, 2019, which is incorporated herein in its entirety by reference.

FIELD

The present disclosure relates generally to devices that reorient metallic containers in a manufacturing line.

BACKGROUND

Several actions are performed on a container in a manufacturing line that transform an initial, blank metallic sheet into a finished container. For instance, a metallic sheet such as aluminum is drawn and ironed into a particular shape, trimmed, flanged, decorated, coated, and ultimately combined with an end closure at a filler to create a finished product. These actions are performed at different stations in one or more manufacturing lines, and each of the actions may be performed with the container held in a different orientation. For example, the container may need to be oriented horizontally for trimming and then vertically for palletization. Through the course of the manufacturing line, the container may need to change orientations multiple times.

In prior art container manufacturing lines, a rail system is used to reorient containers between stations. This type of system typically comprises a series of metal rails that receives and confines the containers so that the containers change orientation as the rails turn and change orientation. The system can have multiple rails arranged around the sides of the generally rectangular cross section of a container, and the rails are spaced apart from each other and do not form an enclosed space. In addition, these rails are sized and configured to operate with a single size or dimension of container. If a manufacturing line switches from production of a first container with one size to a second container of another size, then the rails for the first container must be changed for completely different rails for the second container. This process of swapping sets of rails can take hours to complete. In a manufacturing line for containers, or any manufacturing line, hours of lost productivity is significant, and lost productivity results in lost revenue and profit.

SUMMARY

The present disclosure provides a rotational device that reorients a container from a first orientation to a second orientation and that can be utilized for a plurality of container sizes or dimensions. As a result, there is no need to completely change rail systems when the manufacturing line switches from production of a container with one dimension to a container of another dimension. Thus, embodiments of the present disclosure reduce or eliminate the lost productivity and costs associated with changing rail systems. In one example, the rotational device can reorient both a 16 oz (~473 mL) container and a 24 oz (~710 mL) container from a horizontal orientation to a vertical orientation.

It is an aspect of some embodiments of the present disclosure to provide four surfaces that define an enclosed passageway through a rotational device from an entrance to an exit. Each of the surfaces corresponds to a side of the generally rectangular cross section of a container. With the surfaces forming an enclosed passageway, a smaller container cannot fall from the rotational device, unlike prior art rail systems. Thus, the enclosed passageway contributes to the ability of the rotational device to function with different sized containers to provide enhanced flexibility in a container manufacturing plant. However, it will be appreciated that the surfaces may be non-continuous and/or may form a non-enclosed passageway in various embodiments.

It is a further aspect of embodiments of the present disclosure to provide a rotational device with a passageway having a specific geometry to ensure the reliable reorientation of different sized containers. Thousands and even millions of containers are expected to be produced in such a manufacturing line, and a small change in geometry causes excessive jostling or a container jam, which then causes a major loss in materials and production value. Further, in some embodiments, the containers are metallic and are susceptible to developing imperfections or worse in the presence of excessive forces. Thus, the geometries discussed herein reduce forces experienced by a container, reduce jostling and increase stability, all in view of a rotational device operating with containers having differing sizes.

It is another aspect of some embodiments of the present disclosure to provide a rotational device where containers with different dimensions are aligned against a common surface to reduce jostling and movement. As described herein, embodiments of the rotational device have surfaces that define a passageway that rotates from a first orientation to a second orientation. In some embodiments, the passageway rotates 90 degrees in a clockwise manner. To prevent smaller containers from moving or jostling too much within the passageway, the bottoms of the containers are aligned with the right edge of the entrance of the passageway. Since a surface extends from a right edge of the entrance to a bottom edge of the exit, the smaller containers are less likely to move or jostle within the rotational device, and this contributes to the ability of the rotational device to function with different sized containers.

This alignment can be accomplished in a number of ways. In some embodiments, a track leading to the rotational device has an interior dimension that tapers and reduces in size to reduce jostling of the containers. In some embodiments, the containers approach and enter the rotational device in a horizontal orientation, and thus, the left and right sides of the track constrain the "height" of the container. The left and right sides taper from a first diameter to a smaller second diameter leading to the rotational device to settle the container along a common surface in anticipation of entering the rotational device aligned with an edge or surface such as the right edge of an entrance of the rotational device. In another embodiment, the track turns prior to entering, or entering, the rotational device. The turn causes a centrifugal force that aligns the containers on a common side of the track. In one example, the track makes a left turn prior to entering the rotational device to align the containers on a right side, and the containers enter the rotational device with their bottom surfaces aligned on a common, surface. Further still, in some embodiments, the track does not rely on either of these alignment structures but rather simply terminates at the rotational device such that, for instance, the right side of the track is aligned with the right side of the entrance of the rotational device.

It is an aspect of embodiments of the present disclosure to provide a rotational device with a passageway size that accommodates multiple sizes of containers without excessive jostling or jamming. As noted above, some embodiments of the rotational device can operate with a 16 oz (~473 mL) container and a 24 oz (~710 mL) container. The size of the passageway cannot be too close to the size of the larger containers, or else the larger containers will bind and seize within the passageway. In addition, the size of the passageway cannot be too large compared to the size of the smaller container, or else the smaller containers will jostle and move too much, causing damage to the smaller containers. Thus, the dimensions of the passageway can be described relative to the dimensions of the containers to avoid these issues. In some embodiments, the height of the passageway is larger than a height of the larger container but no larger than 135% of a height of the smaller container to prevent excessive jostling and movement of the smaller containers.

While embodiments of the present disclosure are described with respect to a 16 oz (~473 mL) container and a 24 oz (~710 mL) container, embodiments of the present disclosure can include other container sizes. For instance, some embodiments of the present disclosure can rotate more than two sizes of containers within the parameters and geometry described herein. In a further example, embodiments of the present disclosure can rotate common container sizes such as 12 oz (~355 mL) containers.

It is one aspect of embodiments of the present disclosure to provide a rotational device with a passageway that accommodates the initial rotation of containers and then settles the containers for an exit out of the passageway. As the containers enter the rotational device, the passageway imparts a rotation on the containers. Thus, the dimensions of the passageway can increase from an entrance to a point offset from the entrance to accommodate the containers as the containers experience the new angular momentum. However, the containers must exit the container with minimal jostling and movement so the containers can reliably move to the next station in the manufacturing line. Thus, the dimensions of the passageway taper from a point offset from the exit to the exit itself to reduce jostling. In some embodiments, the passageway has the same dimensions at the entrance and the exit, and the passageway has its largest dimension at a midpoint between the entrance and the exit. However, it will be appreciated that the present disclosure encompasses further embodiments of the passageway and dimensions that accommodate initial rotation but reduce jostling prior to exit.

It is a further aspect of embodiments of the present disclosure to provide a rotational device that imposes a rate of rotation on containers to fully rotate the containers yet minimize forces on the containers. Rate of rotation can be expressed as the rotation of the passageway per distance the passageway extends in length, and an exemplary unit can be degree/mm. The higher the rate of rotation, the faster and more angular momentum imparted on the containers. Since the rotational device both imparts a rotation on the container and stops the rotation between the entrance and exit of the passageway, an excessively high rate of rotation will cause the containers to experience high forces that can damage the containers. Conversely, a rate of rotation that is too low will cause the containers to drag too long on the surfaces of the passageway and also waste space within the manufacturing line. In some embodiments, the rate of rotation is in an unexpected range between approximately 0.1 and 1 degree/mm.

It will be appreciated that the rate of rotation can be constant or continuous through the passageway in various embodiments. In other embodiments, the rate of rotation is variable through the passageway, but a function that expresses the rate of rotation in terms of position along the passageway is smooth and without inflection. Moreover, the present disclosure includes embodiments where the passageway has a non-rotating portion at, for example, the entrance and/or exit of the passageway, and thus, the rate of rotation describes the portion of the passageway that rotates.

It is an aspect of embodiments of the present disclosure to provide a rotational device made from a material that reduces friction on the containers as the rotational device rotates containers. The material can be polyoxymethylene that has a reduced friction compared to a metal-metal interface and is durable enough to rotate thousands and even millions of containers. Even with reduced friction, the rotational device can still slow the speed of the containers in the manufacturing line. Thus, some embodiments of the present disclosure are combined with a track that feeds containers into the rotational device, where a portion of the track descends from a first height to a second height to impart additional speed to the container to offset any reduction in speed caused by the rotational device.

The location of the rotational device can be between a trimming station and a palletizing station in a manufacturing line but can be utilized in any application between any stations and a variety of pieces of equipment to change a position of a container as necessary.

A specific embodiment of the present disclosure is a rotational device for reorienting a first container having a first size and a second container having a smaller second size in a manufacturing line, comprising a body that extends from a first end to a second end; a first surface, a second surface, a third surface, and a fourth surface that define an enclosed passageway that extends from the first end to the second end of the body, wherein the passageway rotates from a first orientation to a second orientation between an entrance at the first end of the body and an exit at the second end of the body such that the first container and the second container entering the passageway also rotate from the first orientation to the second orientation; and a height of the passageway defined between the first surface and the third surface, and a width of the passageway defined between the second surface and the fourth surface, wherein the height of the passageway is greater than 101% of a height of the first container and is less than 135% of a height of the second container.

In some embodiments, the height and the width of the passageway are smaller at the entrance than at a point between the entrance and the exit to accommodate rotation of the first and second containers. In various embodiments, the height and the width of the passageway are larger at the point between the entrance and the exit than at the exit to settle movement of the first and second containers. In some embodiments, the height of the passageway is 203.5 mm at the entrance, 204 mm at the point between the entrance and the exit, and 203.5 mm at the exit, and wherein the width of the passageway is 80 mm at the entrance, 81 mm at the point between the entrance and the exit, and 80 mm at the exit. In various embodiments, the first container is a 24 oz (~710 mL) container having the height of approximately 193.7 mm and a width of approximately 76.2 mm, and wherein the second container is a 16 oz (~473 mL) container having the height of approximately 157.2 mm and a width of approximately 68.3 mm.

In some embodiments, the passageway rotates in a clockwise manner by 90 degrees from the first orientation to the second orientation. In various embodiments, a ratio between a rotation angle from the first orientation to the second orientation and a length of the passageway between the first orientation and the second orientation is between approximately 0.1 and 1 degree/mm.

Another particular embodiment of the present disclosure is a method of reorienting containers in a manufacturing line, comprising (i) transporting a plurality of containers oriented in a horizontal direction such that a bottom end of each container of the plurality of containers is aligned on a common plane; (ii) providing a rotational device having a plurality of surfaces that define an enclosed passageway that extends from a first end to a second end of the body, wherein the passageway rotates from a first orientation to a second orientation between an entrance at the first end of the body and an exit at the second end of the body; (iii) transporting the plurality of containers into the passageway, wherein the common plane is aligned with a surface of the plurality of surfaces at the entrance that rotates to define a bottom edge of the exit; and (iv) rotating the plurality of containers in the passageway from the first orientation to the second orientation.

In some embodiments, the method further comprises (v) settling the plurality of containers in a track to align the bottom end of each container of the plurality of containers in the common plane, wherein a dimension between left and right sides of the track reduces from a first size to a small size at the exit of the track to settle the plurality of containers. In various embodiments, the method further comprises (vi) settling the plurality of containers in a track to align the bottom end of each container of the plurality of containers in the common plane, wherein the track turns to impart a centrifugal force on the plurality of containers to settle the plurality of containers. In some embodiments, the passageway extends along a length as the passageway rotates such that a ratio between a rotation angle from the first orientation to the second orientation and the length is between approximately 0.1 and 1 degree/mm.

In various embodiments, the method further comprises (vii) allowing the plurality of containers to initiate rotation in the rotational device by expanding the passageway from a first dimension at the entrance to a larger, second dimension at a point between the entrance and the exit. In some embodiments, the method further comprises (viii) settling the plurality of containers by reducing the passageway from the second dimension at the point to a smaller, third dimension at the exit. In some embodiments, the passageway rotates in a clockwise manner from the first orientation to the second orientation. In various embodiments, the plurality of containers comprises at least one container having a first size and at least one container having a smaller second size. In some embodiments, the plurality of containers are transported in the horizontal orientation from a first height to a lesser, second height such that the plurality of containers enter the passageway at an increased speed due to gravity.

A further embodiment of the present disclosure is a rotational device for reorienting a first container having a first size and a second container having a smaller second size in a manufacturing line, comprising a body that extends from a first end to a second end; and a first surface, a second surface, a third surface, and a fourth surface that define an enclosed passageway that extends from the first end to the second end of the body by a length, wherein the passageway rotates from a first orientation to a second orientation between an entrance at the first end of the body and an exit at the second end of the body such that the first container and the second container entering the passageway also rotate from the first orientation to the second orientation, wherein a ratio between a rotation angle from the first orientation to the second orientation and the length is between approximately 0.1 and 1 degree/mm.

In some embodiments, the passageway continuously rotates between two points along the length of the passageway. In various embodiments, a ratio of the height of the passageway to the width of the passageway is between approximately 2.5 to 2.6 to accommodate the first container and the second container. In some embodiments, the plurality of surfaces comprises four surfaces oriented at right angles to each other. In various embodiments, the height of the passageway is greater than 101% of a height of the first container and is less than 133% of a height of the second container.

Although generally referred to herein as a "bottle," "beverage bottle," "metallic beverage bottle," "metallic container," "beverage container," "aluminum bottle," "can," and "container," it should be appreciated that the methods and apparatus described herein may be used with containers of any size or shape and that are formed of any material, including, but not limited to metal, plastic, and glass containers including, without limitation, beverage cans and beverage bottles. Further, as will be appreciated by one of skill in the art, the methods and apparatus of the present disclosure may be used for any type of container and are not specifically limited to a beverage container such as a soft drink or beer can.

The terms "metal" or "metallic" as used hereinto refer to any metallic material that may be used to form a container, including without limitation aluminum, steel, tin, and any combination thereof. However, it will be appreciated that the apparatus and methods of the present disclosure may be used with threaded containers formed of any material, including paper, plastic, and glass.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

Unless otherwise indicated, all numbers expressing quantities, dimensions, conditions, and so forth used in the specification and claims are to be understood as being modified in all instances by the term "about" or "approximately" or "~". One skilled in the art will appreciate that these terms, for instance, can imply variation, on a relative basis, of less than 10%.

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the Summary, Brief Description of the Drawings, Detailed Description, Abstract, and Claims themselves.

The Summary is neither intended, nor should it be construed, as being representative of the full extent and scope of the present disclosure. Moreover, references made herein to "the present disclosure" or aspects thereof should be understood to mean certain embodiments of the present disclosure and should not necessarily be construed as limiting all embodiments to a particular description. The present disclosure is set forth in various levels of detail in the Summary as well as in the attached Drawings and the Detailed Description and no limitation as to the scope of the present disclosure is intended by either the inclusion or non-inclusion of elements or components. Additional aspects of the present disclosure will become more readily apparent from the Detailed Description, particularly when taken together with the Drawings.

BRIEF DESCRIPTION OF THE DRAWINGS

The accompanying Drawings, which are incorporated herein and constitute a part of the specification, illustrate embodiments of the disclosure and together with the Summary given above and the Detailed Description given below serve to explain the principles of these embodiments. In certain instances, details that are not necessary for an understanding of the disclosure or that render other details difficult to perceive may have been omitted. It should be understood, of course, that the present disclosure is not necessarily limited to the particular embodiments illustrated herein. Additionally, it should be understood that the Drawings are not necessarily to scale.

Figure 1A:
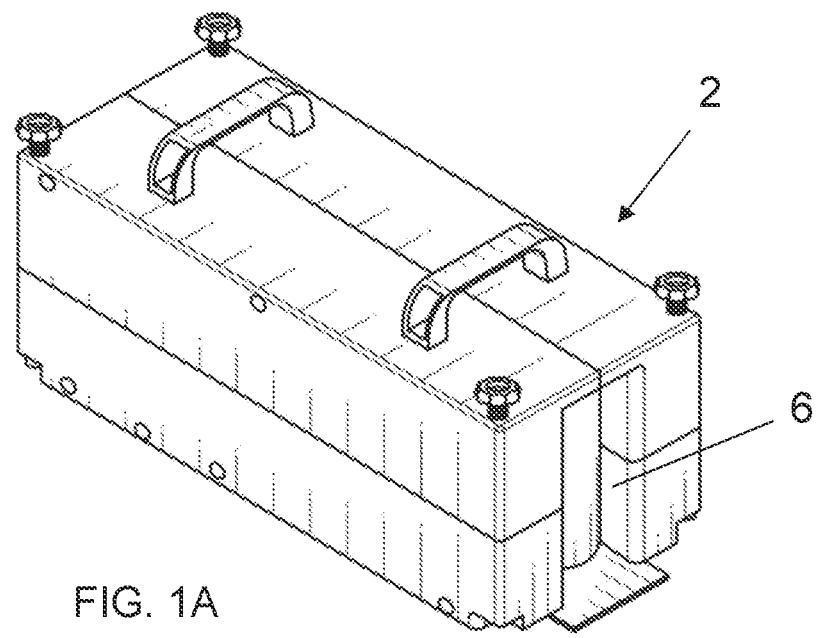
FIG. 1A is top perspective view of a rotational device according to an embodiment of the present disclosure.

To assist in the understanding the present disclosure the following list of components and associated numbering found in the Drawings is provided herein:

| Number | Component |
| --- | --- |
| 2 | Rotational Device |
| 4 | Entrance |
| 6 | Exit |
| 8 | Container |
| 10 | Base |
| 12 | First Insert |
| 14 | Spacer |
| 16 | Second Insert |
| 18 | Top |
| 20 | Passageway |
| 22 | Passage Height |
| 24 | Passage Width |
| 26 | First Container |
| 28 | Second Container |
| 30 | Overlap |
| 32 | First Surface |
| 34 | Second Surface |
| 36 | Third Surface |
| 38 | Fourth Surface |
| 40 | Edge |
| 42 | Minimum Container Height |
| 44 | Passage Length |
| 46 | Track |
| 48 | First Side |
| 50 | Second Side |
| 52 | First Diameter |
| 54 | Second Diameter |
| 56 | Centrifugal Force |

DETAILED DESCRIPTION

The present disclosure has significant benefits across a broad spectrum of endeavors. It is the Applicant's intent that this specification and the claims appended hereto be accorded a breadth in keeping with the scope and spirit of the disclosure being disclosed despite what might appear to be limiting language imposed by the requirements of referring to the specific examples disclosed. To acquaint persons skilled in the pertinent arts most closely related to the present disclosure, a preferred embodiment that illustrates the best mode now contemplated for putting the disclosure into practice is described herein by, and with reference to, the attached Drawings that form a part of the specification. The exemplary embodiment is described in detail without attempting to describe all of the various forms and modifications in which the disclosure might be embodied. As such, the embodiments described herein are illustrative, and as will become apparent to those skilled in the arts, may be modified in numerous ways within the scope and spirit of the disclosure.

Figure 1B:
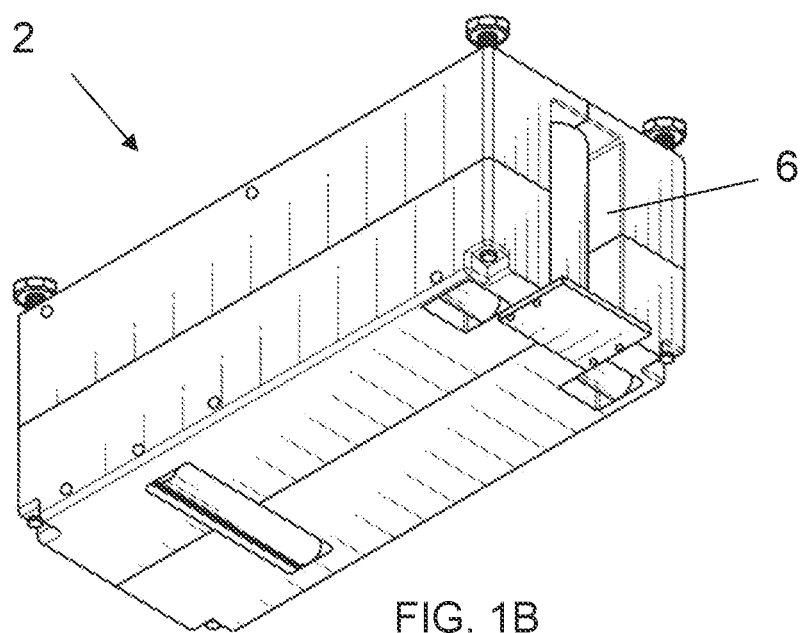
FIG. 1B is a bottom perspective view of the rotational device in FIG. 1A according to an embodiment of the present disclosure.
Figure 1C:
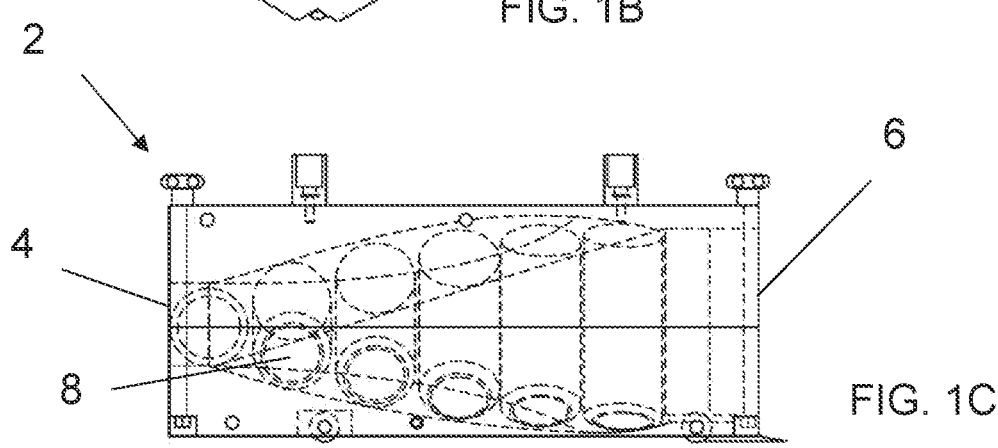
FIG. 1C is a side view of the rotational device in FIG. 1A depicting the rotation of a container in broken lines according to an embodiment of the present disclosure.

Referring now to FIGS. 1A-1C, various views of a rotational device 2 are provided. FIG. 1A is a top perspective view of the rotational device 2, FIG. 1B is a bottom perspective view of the rotational device 2, and FIG. 1C is a side view of the rotational device 2. As shown in these figures, the rotational device 2 has an entrance 4 where the containers 8 enter the rotational device 2 in a first orientation and an exit 6 where the containers 8 exit the rotational device 2 in a second orientation. Specifically in FIGS. 1A-1C, the containers 8 enter the rotational device 2 in a horizontal orientation, rotate clockwise through the rotational device 2, and then exit the rotational device 2 in a vertical orientation having rotated 90 degrees. While the figures depict a clockwise rotation of 90 degrees, it will be appreciated that embodiments of the present disclosure encompass counter-clockwise rotation as well as any first and second orientations, i.e., any degree of rotation between the entrance 4 and the exit 6. For example, the rotation between orientations can be between approximately 90 degrees to 120 degrees, between approximately 0 degrees and 45 degrees, between approximately 170 degrees and 190 degrees, etc.

It will be further appreciated that a rotational device 2 can be located at any point in the manufacturing line. For instance, a rotational device 2 can be located after a container is trimmed to reorient a container from a horizontal orientation to a vertical orientation. Once in the vertical orientation, the container can be palletized, combined with an end closure, etc. Rollers shown on the bottom surface of the rotational device 2 in FIG. 1B reduce friction between a container or can collecting belt and the rotational device 2.

Figure 2A:
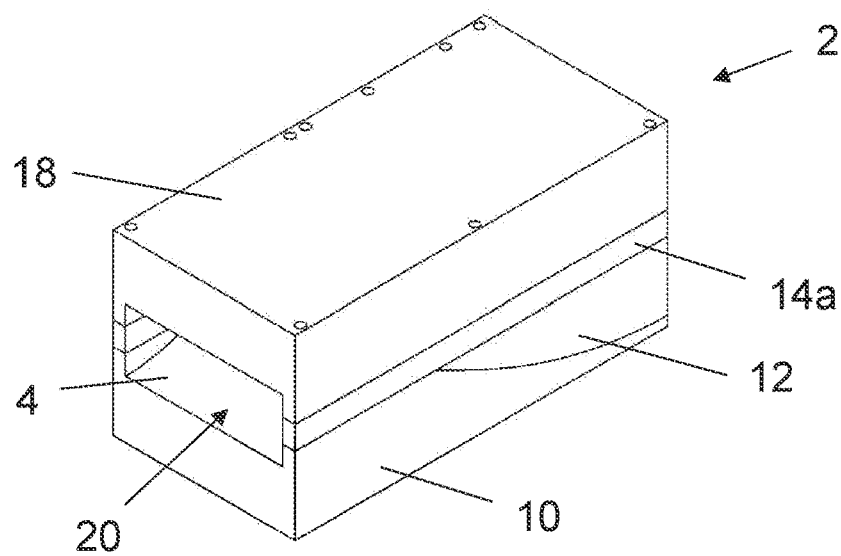
FIG. 2A is a right, top perspective view of a rotational device according to an embodiment of the present disclosure.
Figure 2B:
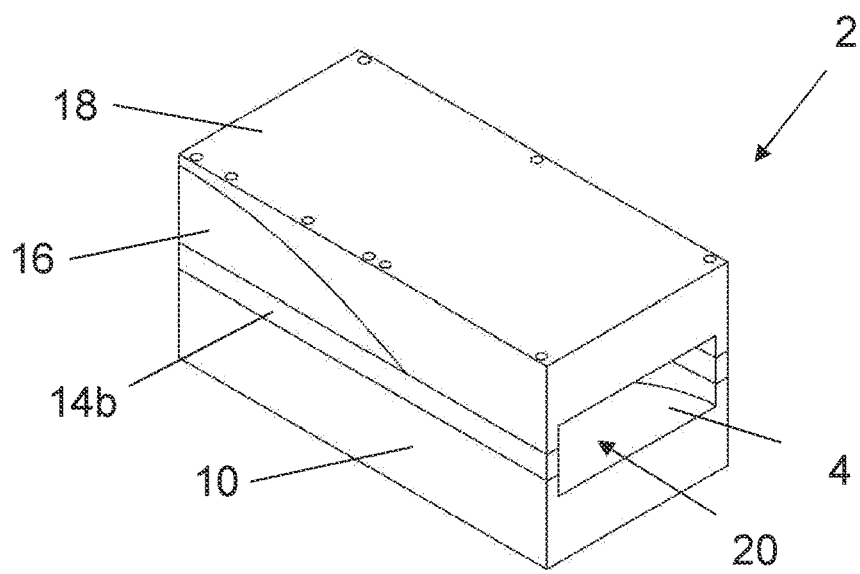
FIG. 2B is a left, top perspective view of the rotational device in FIG. 2A according to an embodiment of the present disclosure.
Figure 2C:
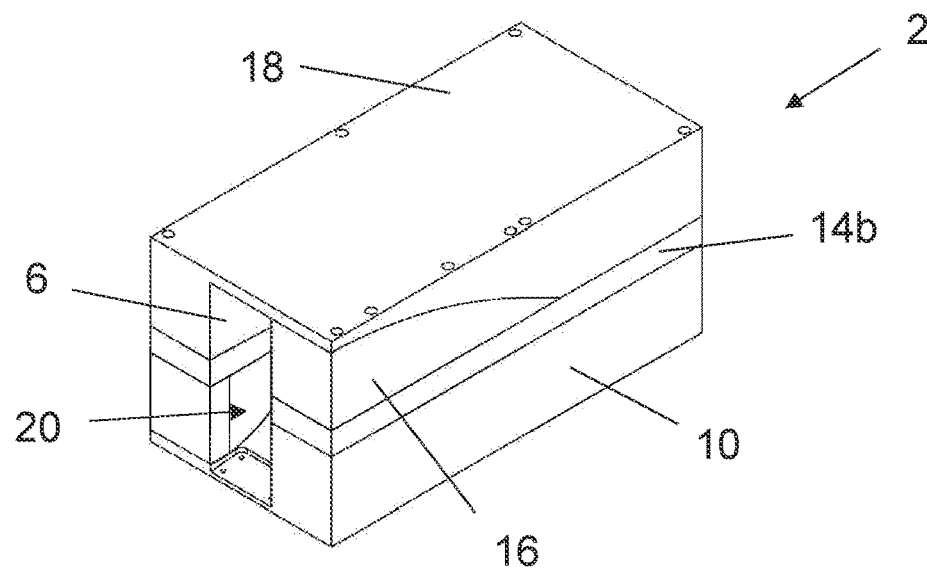
FIG. 2C is rear, top perspective view of the rotational device in FIG. 2A rotated 180 degrees according to an embodiment of the present disclosure.

Referring now to FIGS. 2A-2C, various perspective views of a rotational device 2 are provided. These views show various exemplary components of the rotational device 2. First, a base 10 generally defines a lower portion of the rotational device 2. The base 10 bears the weight of the containers as the containers pass through the rotational device 2 from the entrance 4 to the exit 6. A first insert 12 complements the base 10. Similarly, a top 18 and a second insert 16 define the top portion of the rotational device 2. Spacers 14a, 14b separate the base 10 and first insert 12 from the top 18 and second insert 16. Together, these components 10, 12, 14a, 14b, 16, 18 can be described as a body of the rotational device 2 that defines a continuous passageway 20, which extends from the entrance 4 to the exit 6 of the rotational device 2. It will be appreciated that different configurations of components, including more or fewer components and even a single body, can define the rotational device 2 and the passageway 20 that extends from the entrance 4 to the exit 6 of the rotational device 2.

Generally, the components 10, 12, 14a, 14b, 16, 18 that define the passageway 20 exhibit a type of symmetry where, for instance the base 10 and the top 18 appear similar when viewed in perspective. However, it will be appreciated that embodiments of the present disclosure encompass further rotational devices 2 that do not have this symmetry. An asymmetric arrangement could rotate the container at faster rate near the entrance when compared to the exit, or vice versa.

The components 10, 12, 14a, 14b, 16, 18 of body of the rotational device 2 can be made from one or more materials that contribute to the ability of the rotational device 2 operate with different sized containers. The components 10, 12, 14a, 14b, 16, 18 can be made from polyoxymethylene, which is a thermoplastic that has low friction and high stiffness to accommodate containers with different sizes, shapes, weights, momentums, etc. However, it will be appreciated that one or more of these components 10, 12, 14a, 14b, 16, 18 could be made from other plastics, steel, stainless steel, etc.

Figure 3A:
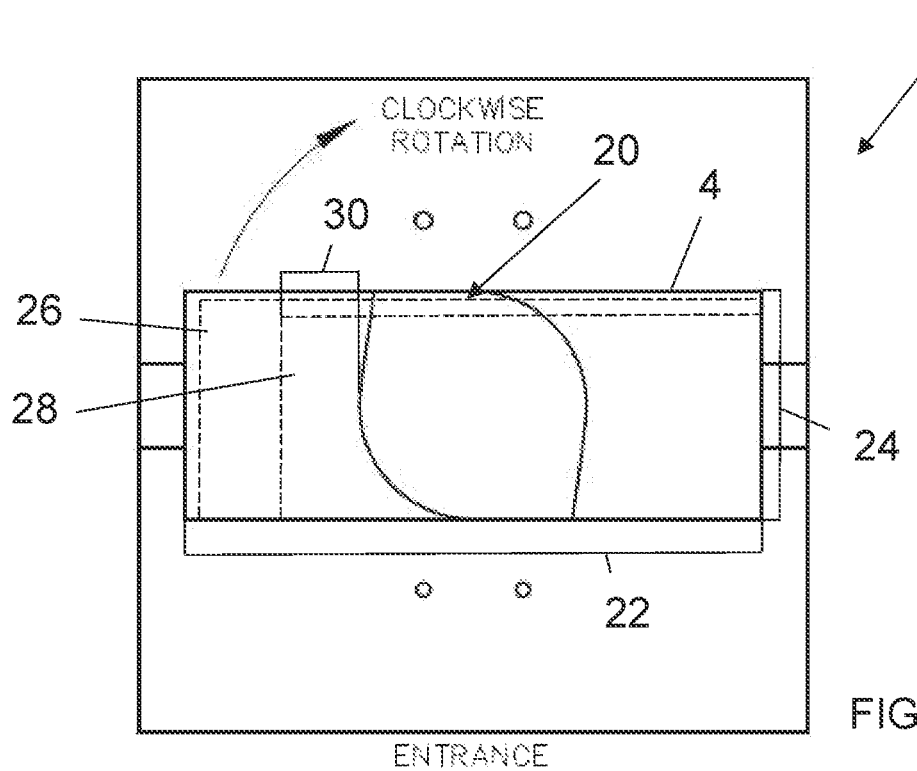
FIG. 3A is a front elevation view of the rotational device in FIG. 2A according to an embodiment of the present disclosure.
Figure 3B:
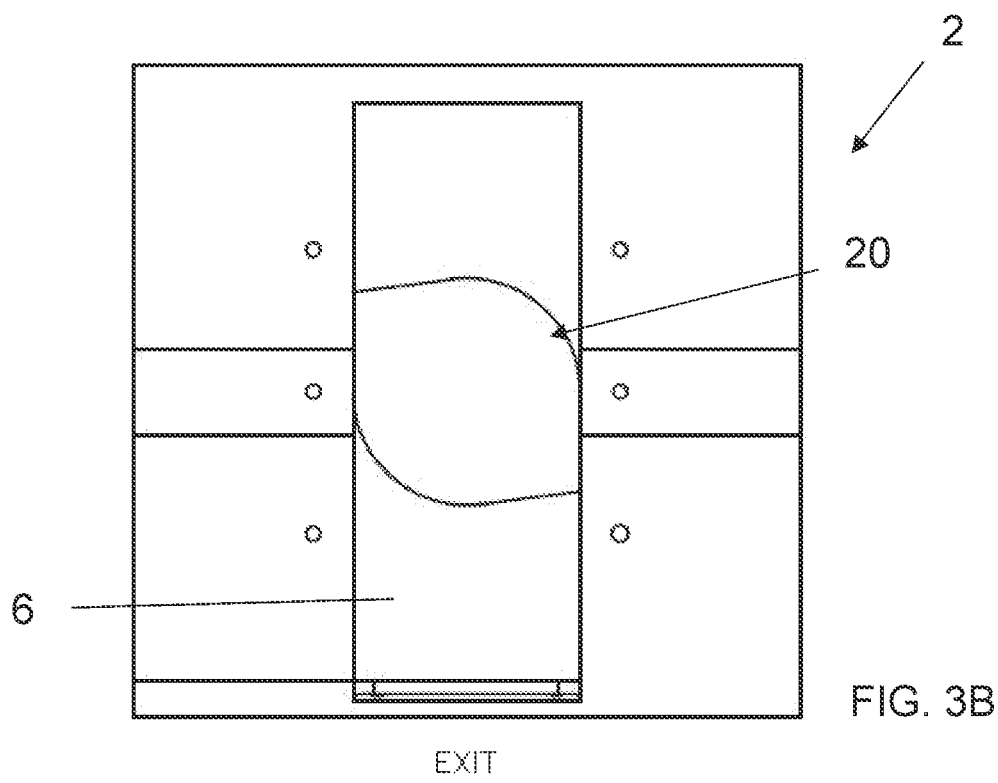
FIG. 3B is a rear elevation view of the rotational device in FIG. 2A according to an embodiment of the present disclosure.

Referring now to FIGS. 3A and 3B, side elevation views of the rotational device 2 are provided. FIG. 3A shows the entrance 4 of the rotational device 2, FIG. 3B shows the exit 6 of the rotational device 2, and the passageway 20 extends between the entrance 4 and the exit 6 of the rotational device 2. As shown in FIG. 3A, the passageway 20 at the entrance 4 has a rectangular shape with a height 22 and a width 24. In the depicted embodiment, the height 22 is between approximately 200 mm and 210 mm. In some embodiments, the height 22 is between approximately 203 mm and 204 mm. In various embodiments, the height 22 is approximately 203.5 mm. The width 24 of the passageway 20 at the entrance 4 can be between approximately 78 mm and 83 mm. In some embodiments, the width 24 is between approximately 80 mm and 81 mm. In various embodiments, the width 24 is approximately 80 mm.

Also shown in FIG. 3A are outlines of containers 26, 28 having different dimensions. As described above, the rotational device 2 is configured to reorient different sized containers to reduce the downtime associated with changing a manufacturing line to operate with one container size to another container size. FIG. 3A shows a first, 24 oz (~710 mL) container 26 and a second, 16 oz (~473 mL) container 28. The first container 26 can have a height of approximately 193.7 mm and a width of approximately 76.2 mm. The second container 28 can have a height of approximately 157.2 mm and a width of approximately 68.3 mm. While these containers 26, 28 are 24 oz (~710 mL) and 16 oz (~473 mL) containers respectively, it will be appreciated that embodiments of the present disclosure can apply to other container sizes. Moreover, in some embodiments, different containers 26, 28 enter the rotational device 2 with the same production speed and at the same angle. In various embodiments, the containers 26, 28 can be gravity fed into the rotational device 2 where the containers 26, 28 do not rotate prior to entering the rotational device 2.

FIG. 3A depicts the alignment of the bottoms of the containers 26, 28 with the right edge of the entrance 4. The containers 26, 28 are fed into the rotational device 2 with this alignment since the right edge of the entrance 4 is one end of a continuous surface that rotates through the passageway 20 and defines the bottom edge of the exit 6. Thus, the alignment reduces movement and jostling of the containers 26, 28 within the rotational device 2 and the passageway 20 and allows the rotational device 2 to operate with different sized containers.

During operation, the larger, first container 26 has a height and width that is less than the height 22 and the width 24 of the passageway 20 to allow the first container 26 to move and rotate through the passageway 20. The smaller, second container 28 has a height that is large enough so that the top of the second container 28 at least partially overlaps 30 a left surface when shown in this elevation view when the bottom edge of the container 28 is aligned with the right edge of the entrance 4. This overlap 30 ensure that a smaller container still sufficiently contacts the surfaces that define the passageway to rotate from a first orientation to a second orientation. In some embodiments, the overlap is at least 10 mm. In various embodiments, the overlap is approximately 15 mm. As described in further detail below, the left (second surface 34) defines the bottom edge of the entrance 4, rotates 90 degrees through the passageway 20, and then defines a side edge of the exit 6. The top of the second container 28 contacts the left surface to rotate the container 28 through the passageway 20.

In order for the rotational device to operate properly with multiple sizes of containers, the size of the passageway must be large enough to allow rotation of the larger container but not so large that the smaller container jostles and moves excessively within the rotational device. The relationship between the size of the passageway and the sizes of the containers is critical and can be expressed in relative terms. In some embodiments, the height of the passageway is between approximately 102% and 107% of a height of the larger container. In some embodiments, the height of the passageway, or the larger dimension, is greater than the height, or larger dimension, of the larger container. In various embodiments, the height of the passageway is between approximately 127% and 133% of a height of the smaller container. In various embodiments, the height of the passageway is no larger than 135% of the height of the smaller container to prevent excessive jostling and movement of the smaller containers.

Figure 4A:
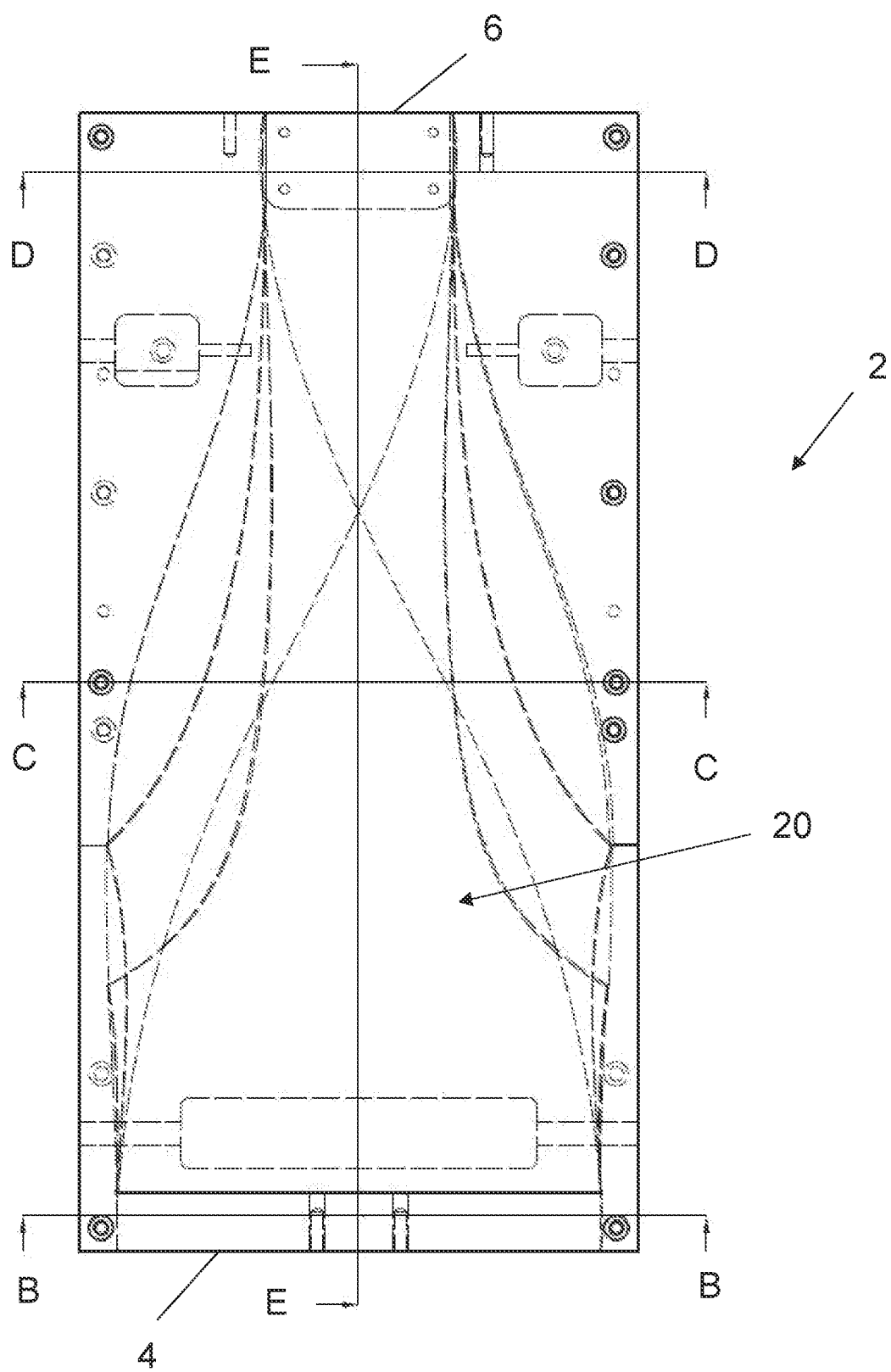
FIG. 4A is a top plan view of a rotational device according to an embodiment of the present disclosure.

Referring now to FIGS. 4A-4E, a top plan view of the rotational device 2 is shown in FIG. 4A and various cross-sectional views of the rotational device 2 are shown in FIGS. 4B-4E. As shown in FIG. 4A, the passageway 20 extends from the entrance 4 to the exit 6 of the rotational device 2. Various lines are also shown in FIG. 4A including lines B-B, C-C, D-D, and E-E.

Figure 4B:
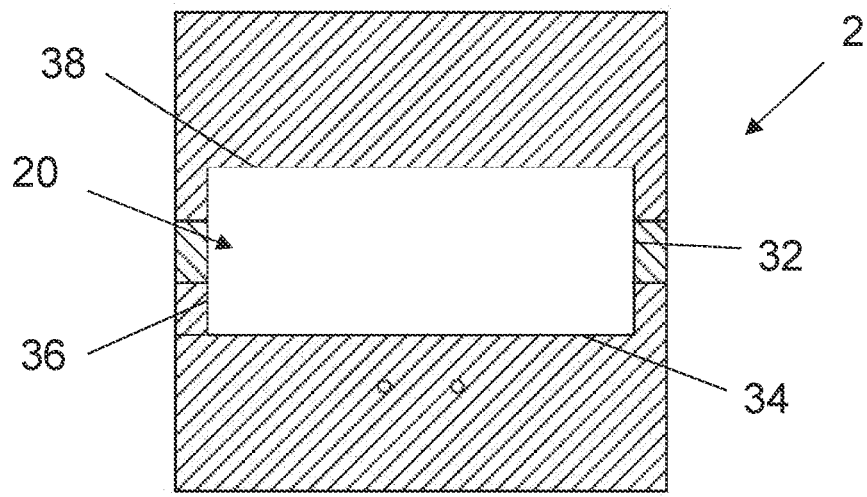
FIG. 4B is a cross-sectional view of the rotational device in FIG. 4A taken along line B-B according to an embodiment of the present disclosure.
Figure 4C:
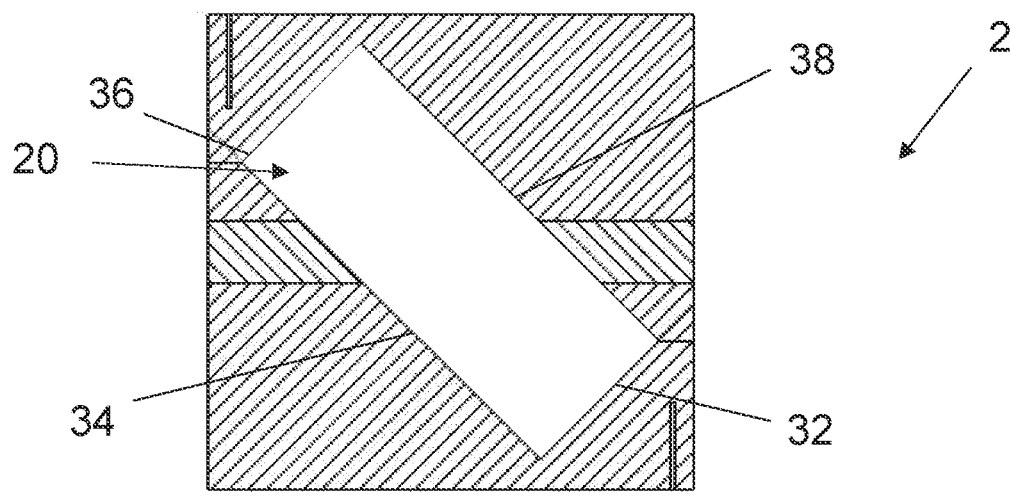
FIG. 4C is a cross-sectional view of the rotational device in FIG. 4A taken along line C-C according to an embodiment of the present disclosure.
Figure 4D:
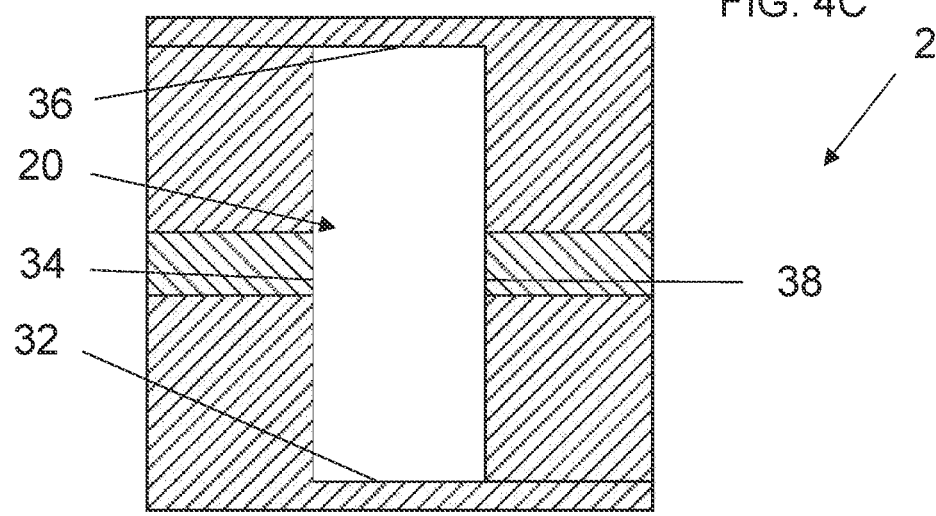
FIG. 4D is a cross-sectional view of the rotational device in FIG. 4A taken along line D-D according to an embodiment of the present disclosure.

FIGS. 4B, 4C, and 4D show cross-sectional views of the rotational device 2 at lines B-B, C-C, and D-D, respectively. As shown in these figures, the passageway 20 has four continuous sides or surfaces 32, 34, 36, 38 that extend along the length of the rotational device 2 to define the passageway 20. FIG. 4B is a cross-sectional view of the rotational device 2 at the entrance. The different sized containers are aligned with the first surface 32, and a second surface 34 defines a bottom edge of the entrance. A third surface 36 and a fourth surface 38 define the remaining sides of the rectangular shape of the passageway 20. FIG. 4C shows a midpoint of the passageway 20 where the surfaces 32, 34, 36, 38 are oriented at 45 degrees, thus a container in the passageway 20 is halfway rotated between a horizontal orientation and a vertical orientation. FIG. 4D is a cross-sectional view of the rotational device 2 at an exit. Now, the first surface 32 defines the "bottom" of the passageway 20 at the exit where the bottom of the container is positioned, and the other surfaces 34, 36, 38 have also rotated 90 degrees.

The size of the passageway 20 can vary through the rotational device. For instance, the passageway 20 can increase in size from an entrance to a point between the entrance and the exit to allow a container more space to perform the initial rotation. Then, the passageway 20 can decrease in size from the point between the entrance and exit to the exit to settle and reduce random or vibratory movement of the containers. In some embodiments, the height of the passageway 20 begins at 203.5 mm at the entrance, increases to 204 mm at a midpoint, and then decreases to 203.5 mm at the exit. The width of the passageway 20 beings at 80 mm, increases to 81 mm at the midpoint, and then decreases to 80 mm at the exit. This change can be expressed in absolute terms where the height varies by 0.5 mm, and the width varies by 1 mm. This change can also be expressed in relative terms where the height varies by approximately 0.25%, and the width varies by approximately 1.25%. with the variation of the width being greater than the variation of the height to achieve the stated functionality.

Figure 4E:
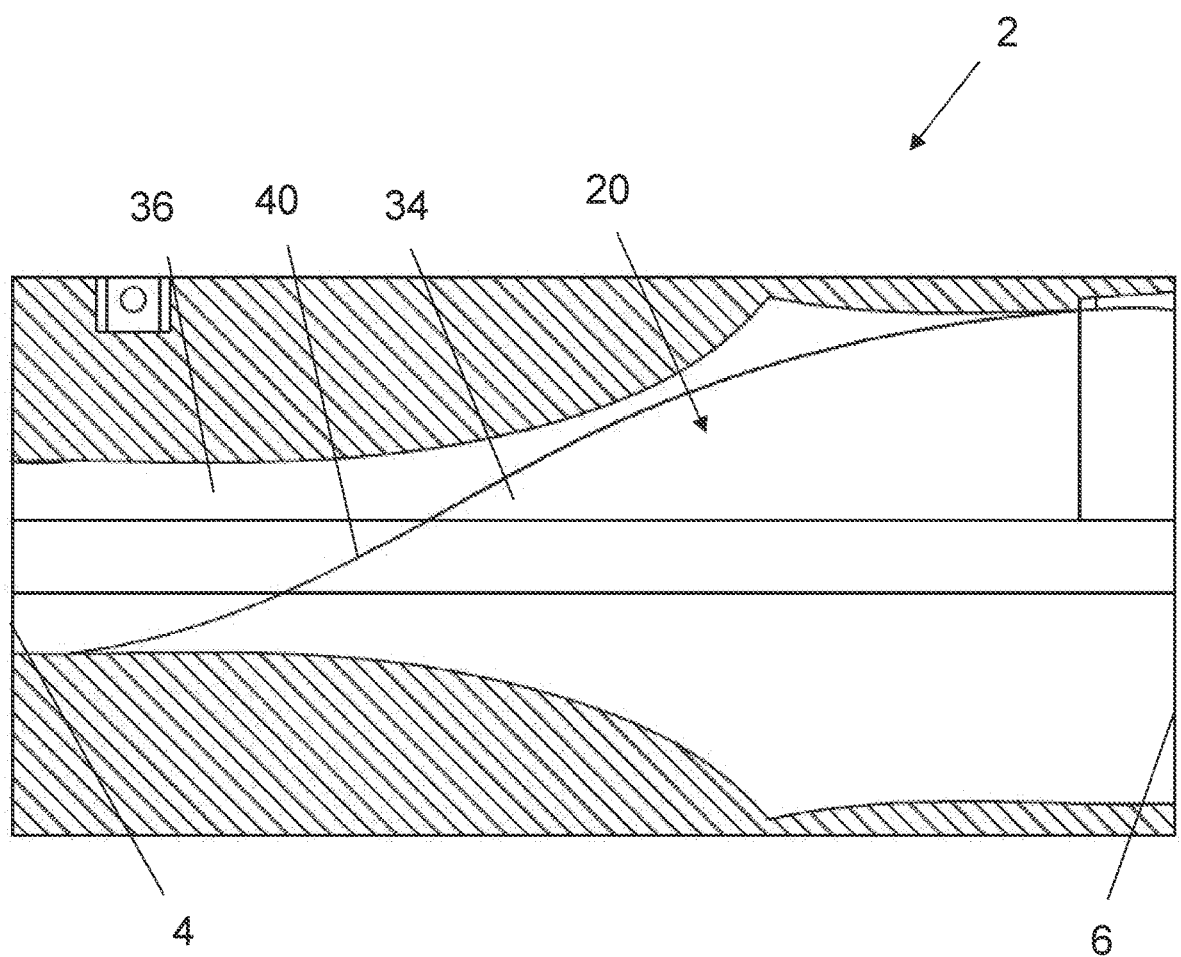
FIG. 4E is a cross-sectional view of the rotational device in FIG. 4A taken along line E-E according to an embodiment of the present disclosure.

FIG. 4E shows a cross-sectional view of the rotational device 2 taken along a longitudinal length of the rotational device 2. The second surface 34 and the third surface 36 of the passageway 20 are depicted as well as an edge 40 between the surfaces 34, 36. The edge 40 demonstrates the continuous and smooth rotation of the surfaces 32, 34, 36, 38 as they extend along the length of the passageway 20 from the entrance to the exit. The surfaces 32, 34, 36, 38 form an enclosed passageway 20 that retains containers regardless of the dimension of the containers, and the passageway 20 can be described in some embodiments as a parabolic shape that is fit to the constraints of the entrance and the exit.

Now referring to FIGS. 5A-5D, various views of the base 10 of the rotational device are provided. The base 10 extends from the entrance 4 to the exit 6, and the base 10 also defines part of the first surface 32 and part of the second surface 34 that define the passageway through the rotational device. The part of the passageway that rotates extends along a length 44, which is essentially the length of the body in this embodiment. It will be appreciated that in other embodiments, the passageway may have non-rotating parts. The rate at which the passageway rotates along this length 44 is critical as too fast of a rotation can impart too much angular moment on the containers and damage the containers. Too slow of a rotation can cause the containers to drag on the surfaces that define the passageway for too long, and too slow of a rotation would create an excessively long rotational device when space within a manufacturing line is at a premium. The rate of rotation can be expressed in degrees/mm. In some embodiments, a ratio between a rotation angle between a first orientation and a second orientation and a length is between approximately 0.1 and 1 degree/mm. In some embodiments, the rate of rotation is less than 0.3 degrees/mm. In various embodiments, the rate of rotation is approximately 0.2 degrees/mm.

Figure 5A:
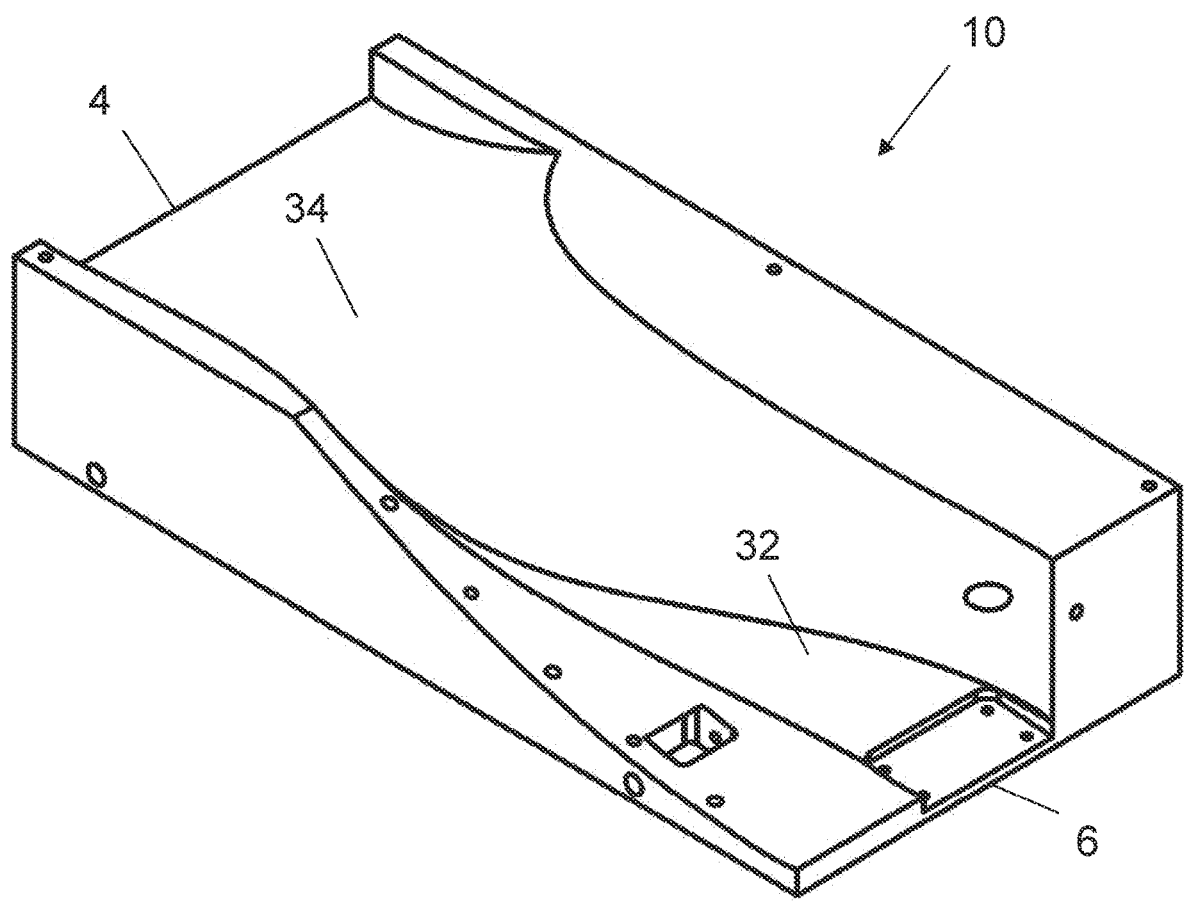
FIG. 5A is a top perspective view of a base of a rotational device according to an embodiment of the present disclosure.
Figure 5B:
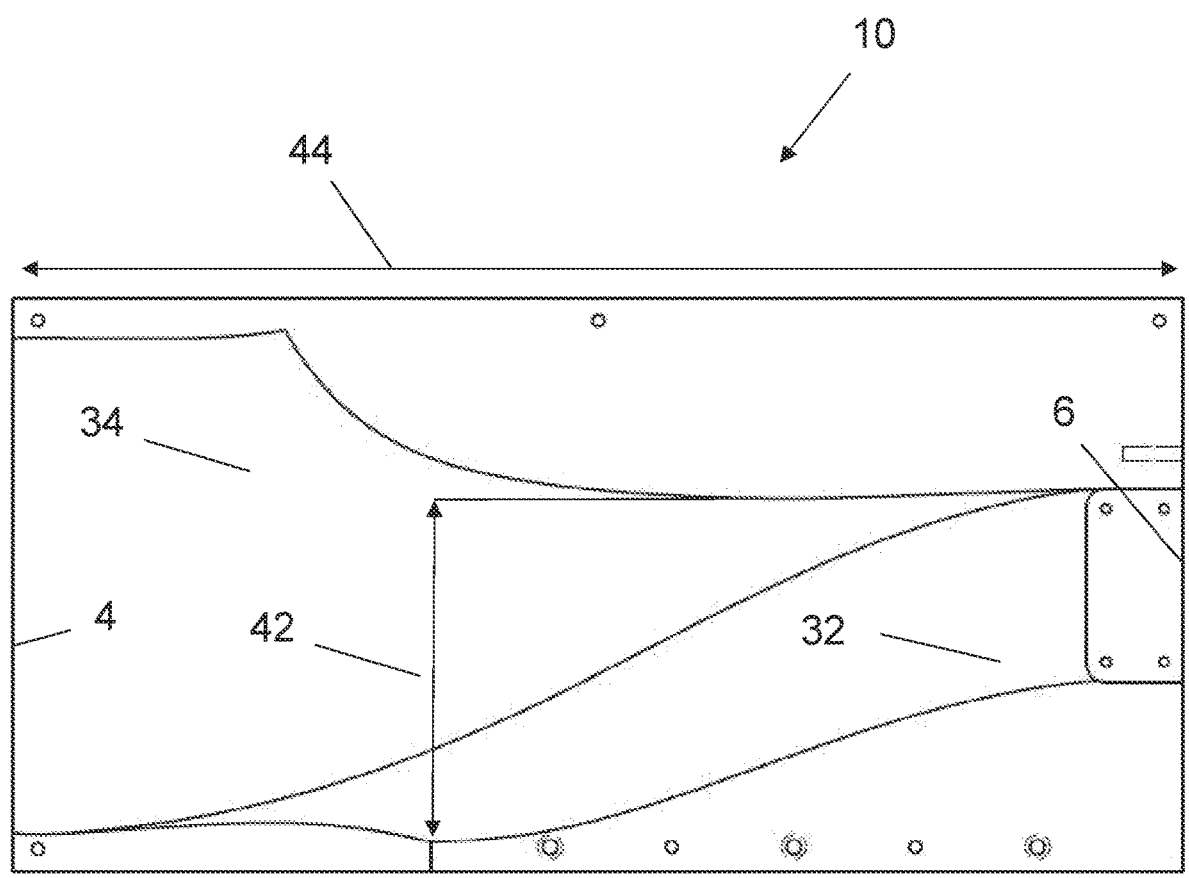
FIG. 5B is a top plan view of the base in FIG. 5A according to an embodiment of the present disclosure.
Figure 5C:
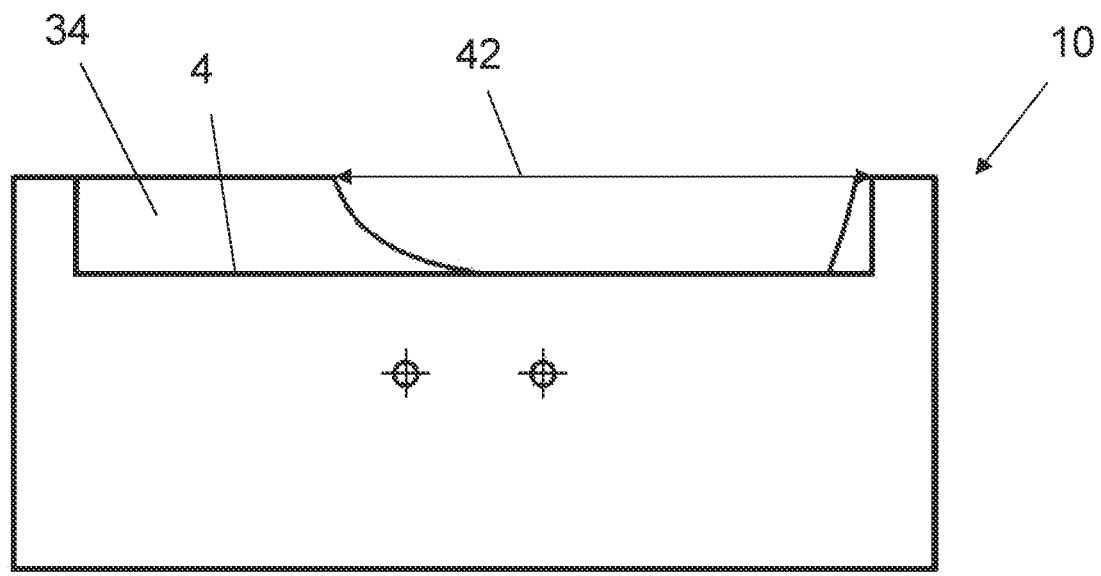
FIG. 5C is a front elevation view of the base in FIG. 5A according to an embodiment of the present disclosure.
Figure 5D:
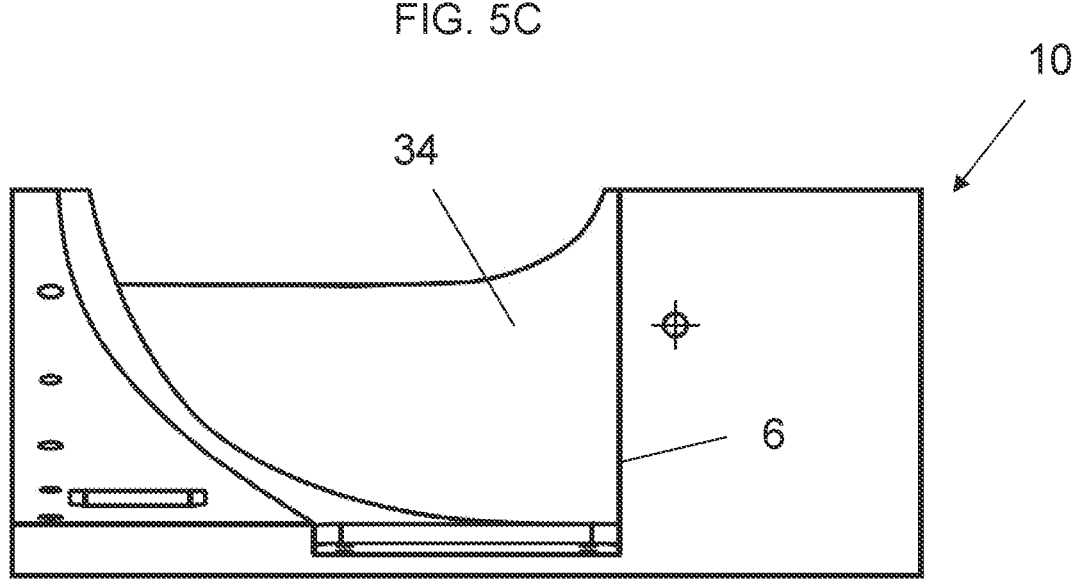
FIG. 5D is a rear elevation view of the base in FIG. 5A according to an embodiment of the present disclosure.

FIGS. 5B and 5C show a dimension 42 of the base 10 that defines the minimum container height. As described above, the rotational device can operate with a plurality of container sizes. The containers must have a height that is greater than a certain dimension 42 to allow the container to properly contact the second surface 34, which rotates the container. A container with a height that is less than this dimension 42 may move or jostle too much or have difficulty in complete rotating 90 degrees in a predictable and consistent manner. Preferably, the container has a height that is greater than this dimension 42 as described above with respect to the overlap 30 described above to ensure proper operation of the rotational device. With the dimensions described herein with respect to the size of the passageway, the dimension 42 in FIG. 5C is approximately 142.5 mm. This dimension can also be expressed as a formula relative to the height and width of the passageway where the dimension 42=width+height-width/2.

Figure 6A:
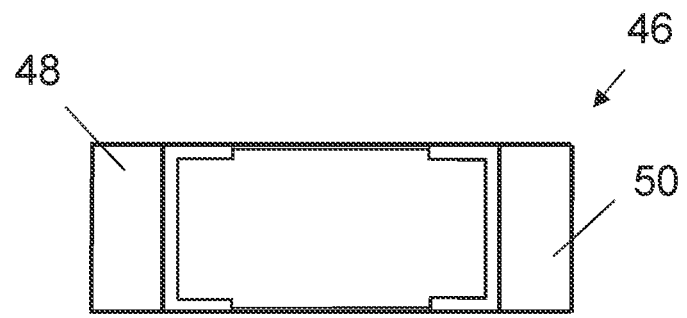
FIG. 6A is a front elevation view of a track according to an embodiment of the present disclosure.
Figure 6B:
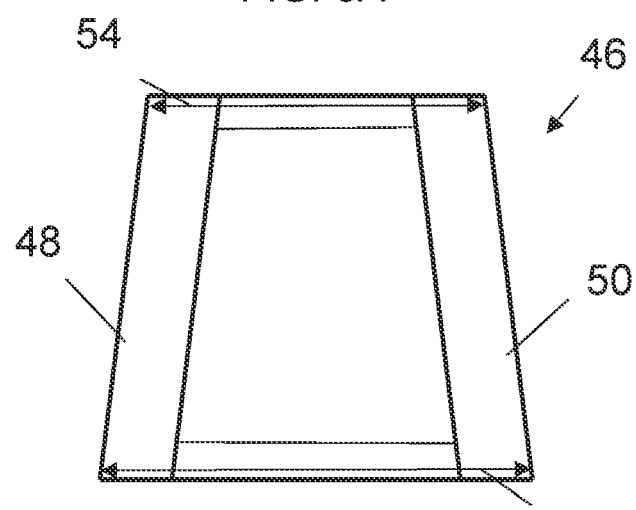
FIG. 6B is a top plan view of the track in FIG. 6A according to an embodiment of the present disclosure.
Figure 6C:
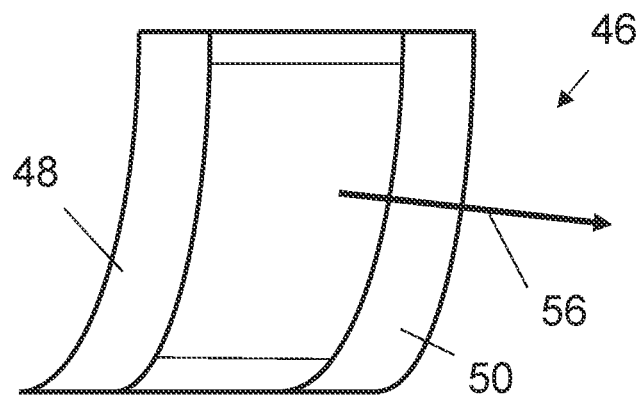
FIG. 6C is a top plan view of another track according to an embodiment of the present disclosure.

Now referring to FIGS. 6A-6C, various views of a track 46 are provided. In these exemplary embodiments, the track 46 transports containers having varying sizes to the rotational device. As noted above, the containers can move and jostle during transportation, but the containers may enter the rotational device in an orderly fashion to reduce jostling and movement within the rotational device to reduce damage to the containers and to reduce the likelihood of jamming the entire manufacturing line. FIG. 6A shows a track 46 that has a first side 48 and a second side 50 that define a rectangular cross-sectional area through which containers of varying sizes travel. It will be appreciated that while a track 46 with two sides 48, 50 is depicted, other structures with fewer or greater rails or sides can transport containers to the rotational device.

FIG. 6B is a top plan view of the track 46 in FIG. 6A where the distance between the sides 48, 50 of the track 46 reduces from a first diameter 52 to a smaller second diameter 54 to reduce jostling and movement of the containers. The reduction in diameter also reduces the variability in positions of the containers such that the containers exit the track 46 in a more orderly and predictable position. This helps align the containers in a particular manner when entering the rotational device. As described in some embodiments herein, the bottoms of the containers are aligned with a right edge of the entrance of the rotational device. This right edge is part of the surface that turns to define the bottom edge at the exit of the rotational device. The reduction in diameter helps align the containers with particular edges or surfaces of the rotational device with minimal jostling and movement.

FIG. 6C shows a track 46 that turns to align the containers in a common plane or surface. When the containers are moving within the track 46 at a given speed and the track 46 turns, a centrifugal force 46 is imparted on the containers. This force 46 causes the containers to move against the second side 50 of the track and align against a common surface of the second side 50. This alignment against a common surface allows the containers to exit the track 46 with, for instance, the bottoms of the containers aligned in a common plane such that the containers enter the rotational device aligned with a certain edge or surface of the rotational device. As stated herein, for rotation in a clockwise manner, having the bottoms of the containers aligned with a right edge of the entrance of the rotational device is advantageous.

The description of the present disclosure has been presented for purposes of illustration and description, but is not intended to be exhaustive or limiting of the disclosure to the form disclosed. Many modifications and variations will be apparent to those of ordinary skill in the art. The embodiments described and shown in the figures were chosen and described in order to best explain the principles of the disclosure, the practical application, and to enable those of ordinary skill in the art to understand the disclosure.

While various embodiments of the present disclosure have been described in detail, it is apparent that modifications and alterations of those embodiments will occur to those skilled in the art. Moreover, references made herein to "the present disclosure" or aspects thereof should be understood to mean certain embodiments of the present disclosure and should not necessarily be construed as limiting all embodiments to a particular description. It is to be expressly understood that such modifications and alterations are within the scope and spirit of the present disclosure, as set forth in the following claims.

What is claimed is:

1. A rotational device for reorienting a first container having a first size and a smaller second container having a second size in a manufacturing line, comprising:
    a body that extends from a first end to a second end;
    a first surface, a second surface, a third surface, and a fourth surface that define an enclosed passageway that extends from said first end to said second end of said body, wherein said passageway rotates from a first orientation to a second orientation between an entrance at said first end of said body and an exit at said second end of said body such that said first container and said second container entering said passageway also rotate from said first orientation to said second orientation; and
    a height of said passageway defined between said first surface and said third surface, and a width of said passageway defined between said second surface and said fourth surface, wherein said height and said width of said passageway are smaller at said entrance than at a point between said entrance and said exit to accommodate rotation of said first and second containers.

2. The rotational device of claim 1, wherein said first orientation is a horizontal orientation, wherein said first and second containers are transported to said rotational device in said horizontal orientation from a first height to a lesser, second height such that said first and second containers enter said passageway at an increased speed due to gravity.

3. The rotational device of claim 1, wherein said height and said width of said passageway are larger at said point between said entrance and said exit than at said exit to settle movement of said first and second containers.

4. The rotational device of claim 3, wherein said height of said passageway is 203.5 mm at said entrance, 204 mm at said point between said entrance and said exit, and 203.5 mm at said exit, and wherein said width of said passageway is 80 mm at said entrance, 81 mm at said point between said entrance and said exit, and 80 mm at said exit.

5. The rotational device of claim 1, wherein said passageway rotates in a clockwise manner by 90 degrees from said first orientation to said second orientation.

6. The rotational device of claim 1, wherein a ratio between a rotation angle from said first orientation to said second orientation and a length of said passageway between said first orientation and said second orientation is between approximately 0.1 and 1 degree/mm.

7. A method of reorienting containers in a manufacturing line, comprising:
    transporting a plurality of containers oriented in a horizontal direction such that a bottom end of each container of said plurality of containers is aligned on a common plane;
    providing a rotational device with a body having a plurality of surfaces that define an enclosed passageway that extends from a first end to a second end of said body, wherein said passageway rotates from a first orientation to a second orientation between an entrance at said first end of said body and an exit at said second end of said body;
    transporting said plurality of containers into said passageway, wherein said common plane is aligned with a surface of said plurality of surfaces at said entrance that rotates to define a bottom edge of said exit, wherein said plurality of containers are transported into said passageway in said horizontal direction from a first height to a lesser, second height such that said plurality of containers enter said passageway at an increased speed due to gravity; and
    rotating said plurality of containers in said passageway from said first orientation to said second orientation.

8. The method of claim 7, further comprising settling said plurality of containers in a track to align said bottom end of each container of said plurality of containers in said common plane, wherein a dimension between left and right sides of said track reduces from a first size to a second size at said exit of said track to settle said plurality of containers, the second size being smaller than the first size.

9. The method of claim 7, further comprising settling said plurality of containers in a track to align said bottom end of each container of said plurality of containers in said common plane, wherein said track turns to impart a centrifugal force on said plurality of containers to settle said plurality of containers.

10. The method of claim 7, further comprising allowing said plurality of containers to initiate rotation in said rotational device by expanding said passageway from a first dimension at said entrance to a larger, second dimension at a point between said entrance and said exit.

11. The method of claim 10, further comprising settling said plurality of containers by reducing said passageway from said second dimension at said point to a smaller, third dimension at said exit.

12. The method of claim 7, wherein said passageway rotates in a clockwise manner from said first orientation to said second orientation.

13. The method of claim 7, wherein a first height and a first width of said passageway at said entrance are smaller than a second height and a second width of said passageway at a point between said entrance and said exit, and wherein said second height and said second width are larger than a third height and third width of said passageway at said exit.

14. The method of claim 7, wherein a height of said passageway is 203.5 mm at said entrance, 204 mm at a point between said entrance and said exit, and 203.5 mm at said exit, and wherein said width of said passageway is 80 mm at said entrance, 81 mm at said point between said entrance and said exit, and 80 mm at said exit.

15. The method of claim 7, wherein said passageway extends along a length as said passageway rotates such that a ratio between a rotation angle from said first orientation to said second orientation and said length is between approximately 0.1 and 1 degree/mm.

16. A rotational device for reorienting a first container having a first size and a second container having a smaller second size in a manufacturing line, comprising:
  a body that extends from a first end to a second end; and
  a first surface, a second surface, a third surface, and a fourth surface that define an enclosed passageway that extends from said first end to said second end of said body by a length, wherein said passageway rotates from a first orientation to a second orientation between an entrance at said first end of said body and an exit at said second end of said body such that said first container and said second container entering said passageway also rotate from said first orientation to said second orientation, wherein a ratio between a rotation angle from said first orientation to said second orientation and said length is between approximately 0.1 and 1 degree/mm, wherein a height and a width of said passageway are larger at a point between said entrance and said exit than at said exit to settle said first and second containers.

17. The rotational device of claim 16, wherein said passageway continuously rotates between two points along said length of said passageway.

18. The rotational device of claim 16, wherein a ratio of said height of said passageway to said width of said passageway is between approximately 2.5 to 2.6 to accommodate said first container and said second container.

19. The rotational device of claim 16, wherein said first, second, third, and fourth surfaces are oriented at right angles to each other.

20. The rotational device of claim 16, wherein said height of said passageway is greater than 101% of a height of said first container and is less than 133% of a height of said second container.

21. The rotational device of claim 16, wherein said height and said width of said passageway are smaller at said entrance than at the point between said entrance and said exit to accommodate rotation of said first and second containers.

* * * * *